(12) United States Patent
Cho et al.

(10) Patent No.: US 6,897,854 B2
(45) Date of Patent: May 24, 2005

(54) ELECTRONIC PEN INPUT DEVICE AND COORDINATE DETECTING METHOD THEREFOR

(75) Inventors: Yong-chul Cho, Kyungki-do (KR); Suk-han Lee, Kyungki-do (KR); Kyoung-sig Roh, Kyungki-do (KR); Jae-won Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 221 days.

(21) Appl. No.: 10/102,649

(22) Filed: Mar. 22, 2002

(65) Prior Publication Data

US 2002/0148655 A1 Oct. 17, 2002

(30) Foreign Application Priority Data

Apr. 12, 2001 (KR) ........................................ 2001-19570

(51) Int. Cl.[7] ................................................. G09G 5/00
(52) U.S. Cl. ..................... 345/179; 345/173; 178/19.01; 178/19.04
(58) Field of Search ................................ 345/173, 175, 345/179, 180; 178/19.01, 19.03, 19.04, 19.05

(56) References Cited

U.S. PATENT DOCUMENTS

| | | | |
|---|---|---|---|
| 4,478,674 A | 10/1984 | Clark | |
| 5,027,115 A | 6/1991 | Sato et al. | |
| 5,111,004 A | 5/1992 | Gullman | |
| 5,115,230 A | * 5/1992 | Smoot | 345/9 |
| 5,165,013 A | * 11/1992 | Faris | 358/1.4 |
| 5,166,668 A | 11/1992 | Aoyagi | |
| 5,247,137 A | 9/1993 | Epperson | |
| 5,434,371 A | 7/1995 | Brooks | |
| 5,502,514 A | * 3/1996 | Vogeley et al. | 348/771 |
| 5,587,558 A | 12/1996 | Matsushima | |
| 5,748,110 A | * 5/1998 | Sekizawa et al. | 341/5 |
| 5,902,968 A | 5/1999 | Sato et al. | |
| 5,981,883 A | 11/1999 | Shriver | |
| 5,981,884 A | 11/1999 | Sato et al. | |
| 5,997,958 A | 12/1999 | Sato et al. | |
| 6,046,733 A | * 4/2000 | Challener et al. | 345/179 |
| 6,084,577 A | * 7/2000 | Sato et al. | 345/179 |
| 6,243,503 B1 | * 6/2001 | Teufel et al. | 382/312 |
| 6,422,775 B1 | * 7/2002 | Bramlett et al. | 401/195 |

FOREIGN PATENT DOCUMENTS

| | | |
|---|---|---|
| JP | 04-242817 A | 8/1992 |
| JP | Hei 6-67799 | 8/1994 |
| JP | 06-44005 A | 12/1996 |
| WO | 94/09447 | 4/1994 |

* cited by examiner

Primary Examiner—Guy J. Lamarre
Assistant Examiner—Fritz Alphonse
(74) Attorney, Agent, or Firm—Burns, Doane, Swecker & Mathis, L.L.P.

(57) ABSTRACT

A electronic pen input device and a coordinate determining method are provided. The electronic pen input device includes an optical 3-dimensional detecting device for detecting orientation angles of a centerline of the pen relative to a ground and a height of the pen over a writing surface, a 3-axis accelerometer for detecting a movement of the pen, and a communication means for sending the detected information to a post processing device.

24 Claims, 9 Drawing Sheets

ELECTRONIC PEN INPUT DEVICE AND COORDINATE DETECTING METHOD THEREFOR

Priority is claimed to Patent Application Number 2001-19570 filed in Rep. of Korea on Apr. 12, 2001, herein incorporated by reference.

BACKGROUND OF THE INVENTION

1. Field of the Invention

The present invention relates to an electronic pen input device and coordinate detecting method therefor, and more particularly to an electronic pen input device which can generates a movement information thereof using a 3-axis accelerometer and an optical 3 dimensional measuring device and a coordinate detecting method therefor.

2. Description of the Related Art

These days, input devices having 2 dimensional sensor arrays such as LCD tablets or digitizer tablets in order to input a pen writing information to PDAs or computerized devices are widely used. These input devices require a relatively wide area 2D sensor array, that is a separately provided detect surface. Accordingly, the portage thereof is inconvenient and it occupies space, and moreover it is expensive. Lighting in view of the technical trend, the PDA becomes smaller and smaller, eventually to be a form of wrist watch or wallet. This trend leads the display of the PDA to be narrow and there will be no more operating space of the pen input device making the writing movement unnatural.

To overcome the above described disadvantage, it is very proper to utilize a pen input device operable within any space without any physical tablet so that there is unlimited input space of the pen input device. To input a document or a picture using a self-detective electronic pen, it must be accomplished that the tip position of the electronic pen relative to any reference coordinate must be continuously calculated. However, most of the writing operation is performed in such a manner of the writing while downing and contacting with the ground and moving while separating upward from the ground. To determine the continuous position of the pen in a coordinate, it is required a means for accurately detecting the position both while in touch and out of touch.

Conventional pen input devices are generally classified into two categories, those having an outside detection method and a pen-inside detection method.

As an outside detection method, there have been proposed a 3-axis detection method (U.S. Pat. No. 5,166,668), and a method using a difference in a time of flights of an electronic wave (U.S. Pat. No. 5,997,958) or a microwave (U.S. Pat. No. 4,478,674). However, in these methods, the signals are sent from the pen and are received outside of the pen. So, in case of mobile terminals, there must be a receiving portion at the main body of the terminals, resulting in a difficulty in delivering.

Also, there was provided a method of determining the tip position of a pen inside of the pen, including a method using a ball rotation (U.S. Pat. No. 5,027,115) and a method detecting the force against the pen (U.S. Pat. Nos. 5,111,004, 5,981,883). However, these methods have a difficulty in determining when the pen is detached from the writing surface. There was also proposed a method using a 2-axis or 3-axis acceleration sensor in which the position of a pen is determined by double integration (U.S. Pat. No. 5,247,137, WO94/09,447, U.S. Pat. No. 5,587,558). Also in this case, it is difficult to mount the acceleration sensor to the pen tip and there can exist a large error in position of the pen because there is no consideration of the inclination angle of the pen centerline. Moreover, the double integration can cause an accumulated position error.

To compensate the error due to the pen inclination, A.T. Cross company (U.S. Pat. No. 5,434,371) proposed a structure in which the acceleration sensor is attached to a tip of a pen and a signal processing portion is located at the upper portion of the pen. However, due to this distance therebetween, there is a much effect of electrical noise and also is no space to mount an ink pot. On the other hand, company Seiko (Japan patent application Hei 6-67,799) proposed a method for determining the position and the inclination angle of a pen in which the position is determined by 2-axis acceleration sensor and the inclination angle thereof is determined through integrating the angular velocity of the pen using 2-axis gyro sensor. Richo K. K. (U.S. Pat. Nos. 5,902,968, 5,981,884) proposed to use 3-axis acceleration sensor and 3-axis gyro sensor. However, in Richo, the writing surface must be perpendicular to the direction of gravity which restrains the pen handling and furthermore, due to the accumulation error and drift error, the acceleration sensor may have an error of order of square of time and the gyro sensor of order of time.

To overcome the inaccuracy in position detecting due to the error accumulation, Intersense Inc. recently adopted an ultrasonic wave sensor so as to decrease the accumulated position error, resulting in an inconvenience in delivery.

SUMMARY OF THE INVENTION

It is an object of the present invention to provide an electronic pen input device and a coordinate detecting method therefor in which the movement of the pen can be accurately detected while reducing the accumulated error in position even when the writing motion is arbitrarily inclined about the writing surface and is detached therefrom.

To achieve the above object of the invention, there is provided an electronic pen input device including an optical 3-dimensional detecting device for detecting orientation angles of a centerline of the electronic pen input device relative to a ground and a height of the electronic pen input device over a writing surface, a 3-axis accelerometer for detecting a movement of the electronic pen input device, and a communication means for sending the detected information to a post processing device.

In the present invention, the optical 3-dimensional detecting device preferably includes a beam radiating portion for radiating beam onto the writing surface so as to form beam spots, and a detecting portion for detecting the beam spots.

The beam radiating portion preferably includes a light source, a first lens for making a beam radiated from the light source go parallel, a lattice dividing the beam through the first lens, and a second lens for directing the beam through the lattice onto the writing surface.

The detecting portion preferably includes a camera lens for condensing the beam spots on the writing surface and a position detector detecting the beam coming through the camera lens.

The electronic pen input device may further include a signal processor for detecting positions of the beam spots detected by the position detector, and a calculator for determining the height of the pen over the writing surface and the orientation angles thereof relative to the ground using the positions of the beam spots.

The electronic pen input device may further include a controller for controlling an on/off operation of the light source.

The beam radiated from the beam radiating portion is preferably offset in centerline thereof relative to the centerline of the pen.

The electronic pen input device may further include a storing means for storing movement information of the pen obtained from the processing device.

The communication means preferably includes a radio-frequency (RF) communication device.

The electronic pen input device may further include a battery for operation.

The electronic pen input device may further include a data processing means for determining the absolute position of the pen tip using data from the 3-axis accelerometer and the optical 3-dimensional detecting device.

The electronic pen input device may further include a stress sensor connected with the tip portion of the pen for detecting whether the tip portion contacts the writing surface.

The electronic pen input device may further include an ink bottle connected with the tip portion so as to inject ink when the pen operates while contacting with a predetermined writing paper.

According to another aspect of the present invention, there is provided a coordinate detecting method comprising detecting three-directional orientation angles of a pen with respect to a writing surface and a height therebetween, and detecting a movement of the pen, transmitting the orientation angles, the height and the movement information to a signal processor so as to determining a position of a tip portion of the pen, and sending the position information to a terminal device by using a communication means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, an electronic pen input device and a position detection method therefor in accordance with preferred embodiments will be described with the attached drawings.

Figure 1:
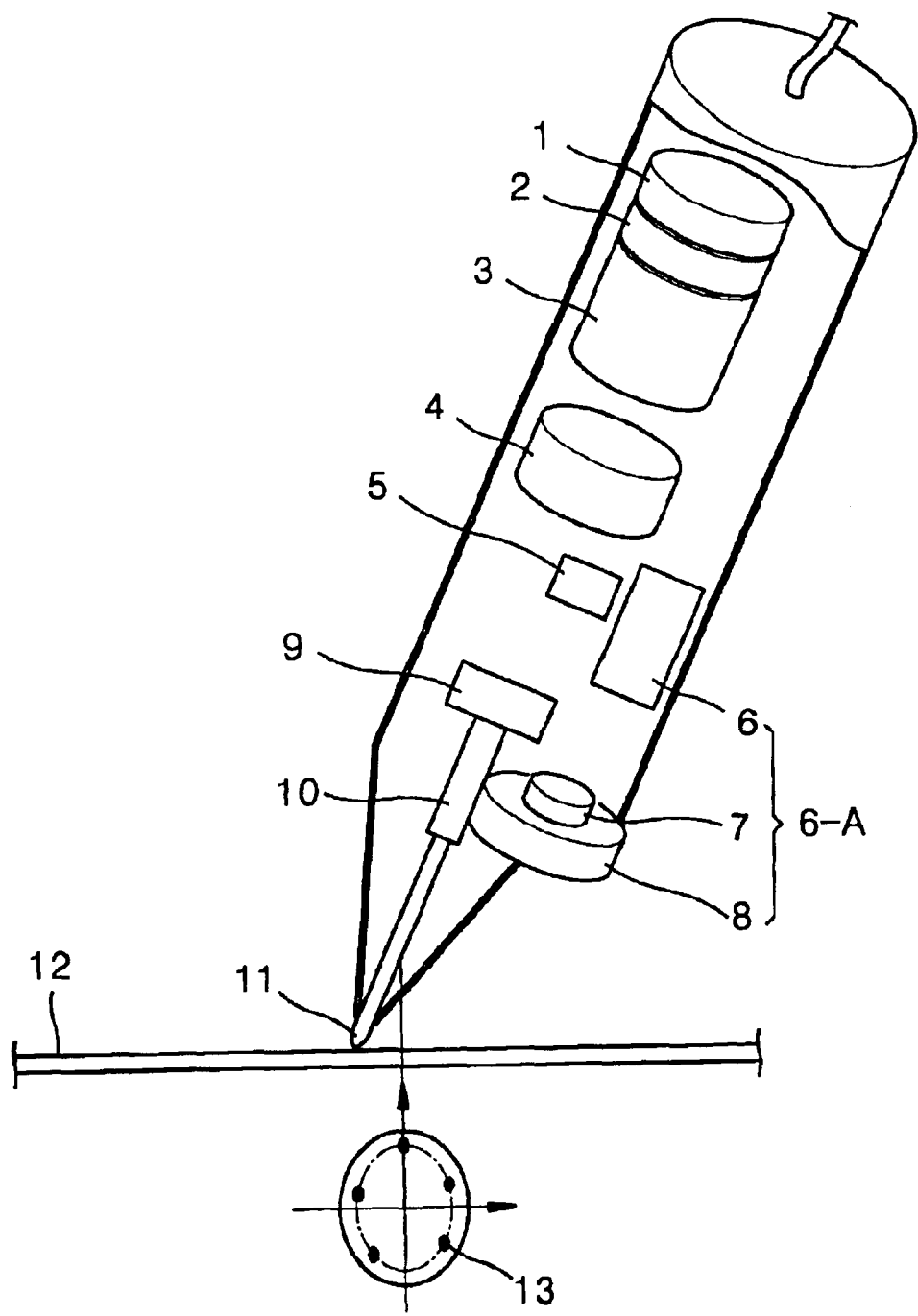
FIG. 1 is a schematic diagram of an electronic pen input device of the invention.

FIG. 1 is a schematic diagram of an electronic pen input device of the invention. Referring to FIG. 1, the electronic pen input device includes a 3-axis accelerometer 4 for detecting a motion in 3-dimensional space and a 3-dimensional optical detector 6-A for detecting an inclination angle and a height of the pen. A CPU 5 is provided for processing an acceleration signal from accelerometer 4 such that the velocity and displacement of the pen can be acquired by integrating the acceleration signal. 3-axis optical detector 6-A includes a beam radiating portion and a beam receiving portion. Preferably, beam is projected onto a writing surface 12 so as to form at least five spots so that the inclination angle and height of the pen can be acquired. The shape and size of an eclipse generated by the spots 13 is changed with the inclination angle and height of the pen about the writing surface 12. This make possible the determination of the coordinates of the spots 13 and therefore through the calculation, the inclination angle and height of the pen over the writing surface 12. Preferably, the invention includes an optical signal processing device 6 and a CPU 5 to process the data about the inclination angle and height. However, in accordance with an embodiment of the invention, the CPU 5 can be omitted when the signal processing is done at a separate computer or a PDA. That is, the CPU is optional.

Preferably, the electronic pen input device includes a battery 3 for the operation of the electronic pen input device and a storage device 2 for storing various date about the pen motion. There is required signal transmission device 1 to send the data to the computer or the PDA. The present invention can be operated in both cases with a wired or a wireless signal transmission. Preferably when a wireless is adopted, an RF communication device can be used. Generally, to determine whether the electronic pen input device contacts with the writing surface 12 or not, a stress sensor 9 can be used. Also, since there is a need to write directly on a paper, an ink spot 10 can be used.

Figure 2:
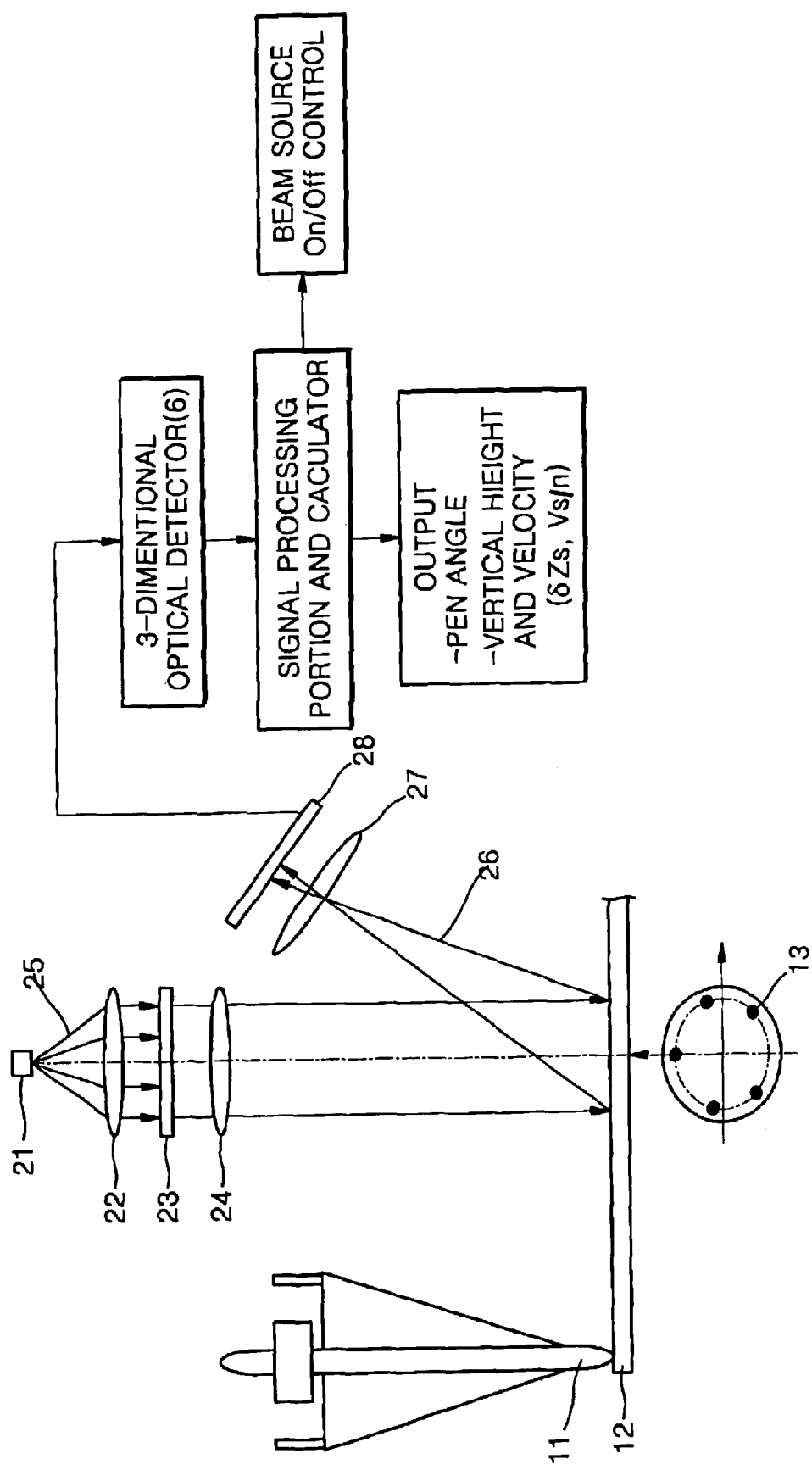
FIG. 2 is an embodiment of a 3-dimensional optical detecting apparatus of the invention.

FIG. 2 shows an embodiment of the 3-dimensional optical detector 6-A of the invention. As explained above, the 3-dimensional optical detector 6 is to detect the inclination angle and the height of the pen with respect to the writing surface 12 and can be aligned in various structures. Referring to FIG. 2, there is an offset between the centerline of the pen and the 3-dimensional optical detector 6-A. The 3-dimensional optical detector 6-A includes a beam source 21, a first lens 22 for parallelizing the beam, a grating 23, a second lens 24 for parallelizing the beam 25 from the beam source 21 toward the writing surface 12, a camera lens 27 for collecting a partly scattered beam from the writing surface 12, a position detector 28 for receiving the beam from the camera lens 27, a signal processing portion determining the position of the pen using the signal from the position detector 28 and a processing device for calculating the inclination angle and height of the pen over the writing surface.

More detailed description about the working mechanism of the 3-dimensional optical detector 6-A will be described hereinafter. Firstly, a beam 25, say, visible light or infrared light is emitted from the beam source 21. The beam source 21 can be a laser diode, a light emitting diode(LED) or the like. The beam from the source is cylindrically parallelized through a first lens 22 and is split into five beam spots aligned along a virtual circle by a grating 23. The split beam is parallelized and projected onto a writing surface 12 through a second lens 24. The projected beam forms an elliptical spots 13 on the writing surface 12 according to an incident angle. Here, if the writing surface 12 is a scattering surface like wood or paper, the beam is scattered diversely and a part of the scattered beam is collected into a camera lens 27 and then a position detector 28. The positions of beam spots 13 can be calculated through a signal processing portion and calculator so that an inclination angle and a height of the pen over the writing surface 12 can be output. The position detector 28 and the signal processing portion can be integrated in one module. Preferably, to reduce the power consumption during not operating, there can be added an on/off controller in the beam source 21.

Figure 3:
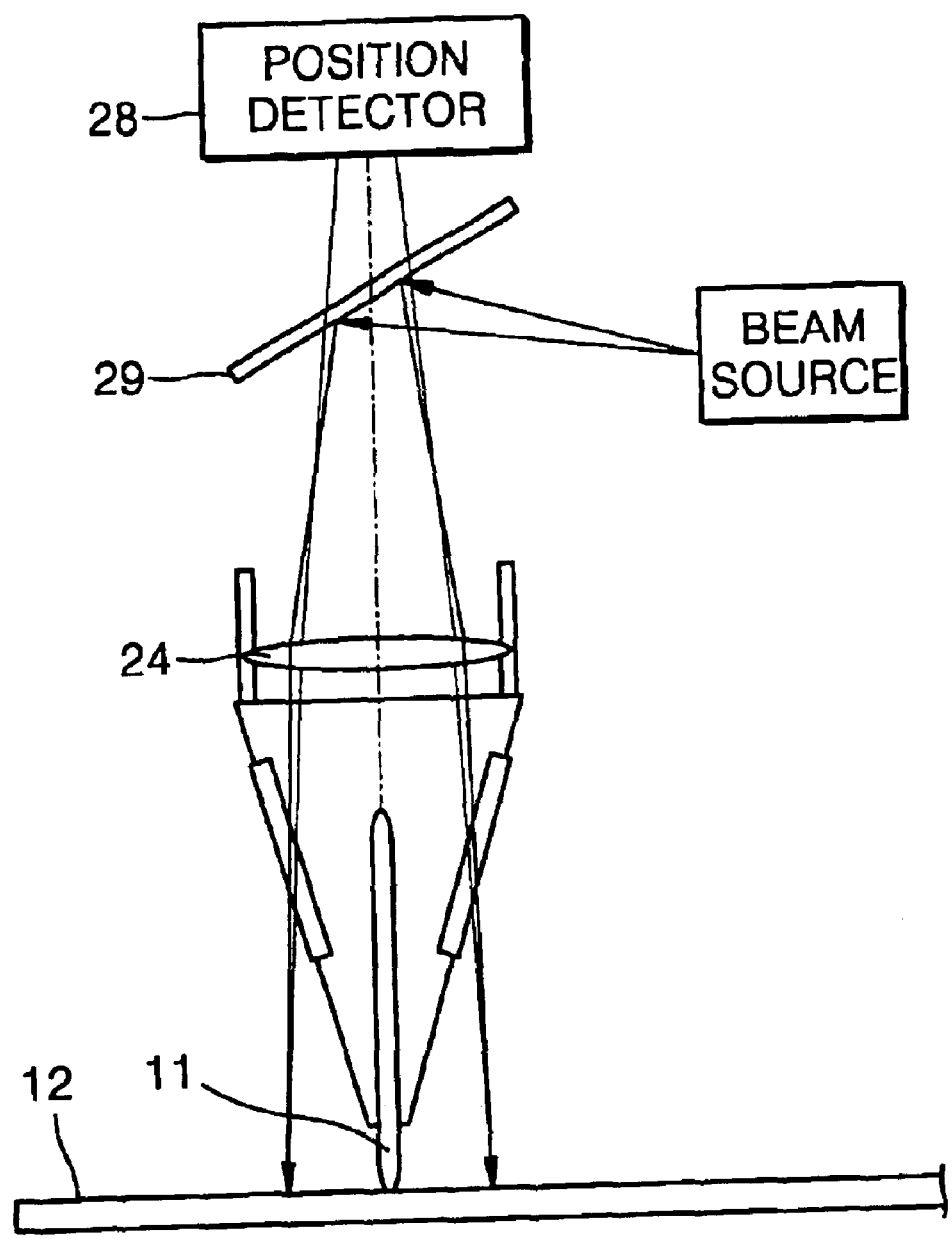
FIG. 3 is another embodiment of the 3-dimensional optical detecting apparatus.

FIG. 3 shows another embodiment of the 3-dimensional optical detector. The alignment thereof is different from the former embodiment in that the beam centerline is coincide with the centerline of the electronic pen input device.

FIGS. 4a to 4f illustrate the principle of the change of the shape of the beam spots according to the inclination angle of the pen. Here, the surface onto which the beam projected is coordinated with X-Y axes, and Z is perpendicular thereto. Three inclination angle variables θ1, θ2, θ3 are changed resulting in a change of the pattern of the beam spots. θ1 represents an angular displacement between a perpendicular axis Zs and the centerline of the pen, θ2 represents a rotating angle of the pen about the Xs-Ys, and θ3 is a rotating angle of the pen itself. δZa represents the distance between the tip of the pen and the writing surface 12. The beam spots form an ellipsoidal shape and are changed in a skewness, long axis and short axis according to the inclination angle of the pen relative to the writing surface. In addition, according to a pen movement in a vertical direction, the size of the ellipse changes in such a manner that the size enlarges when the pen approaches the writing surface and contracts when the pen moves away. Accordingly through these characteristics, the inclination angle and the height of the electronic pen input device can be acquired.

Figure 4A:
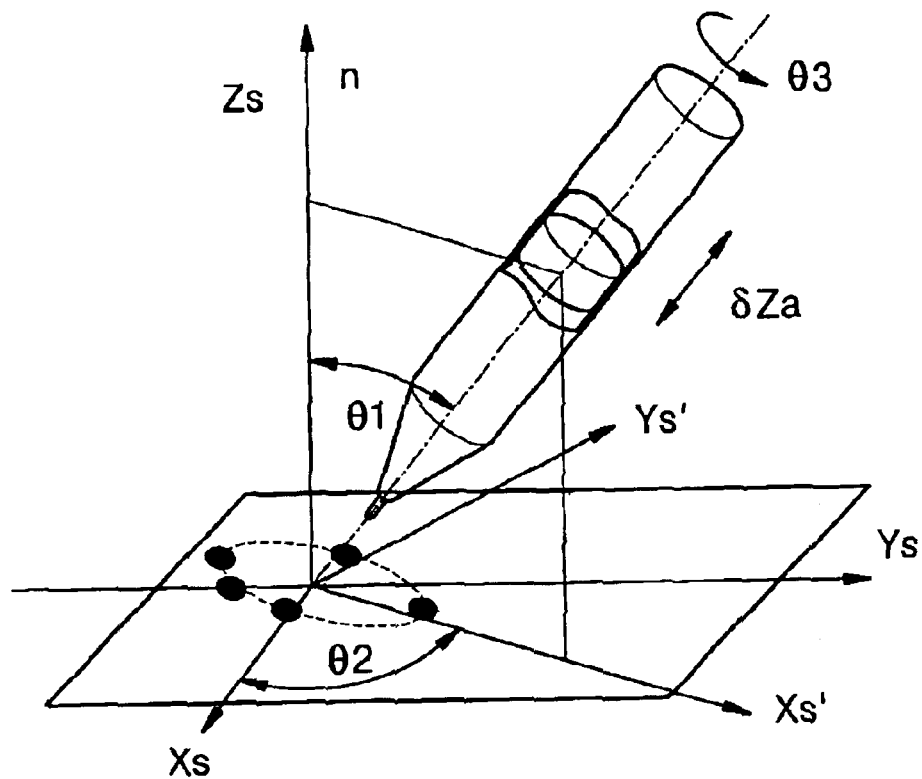
FIGS. 4a to 4f are illustrations of the beam spots' change in form according to the inclination angle of the pen and variations in direction of axis of the pen.
Figure 4B:
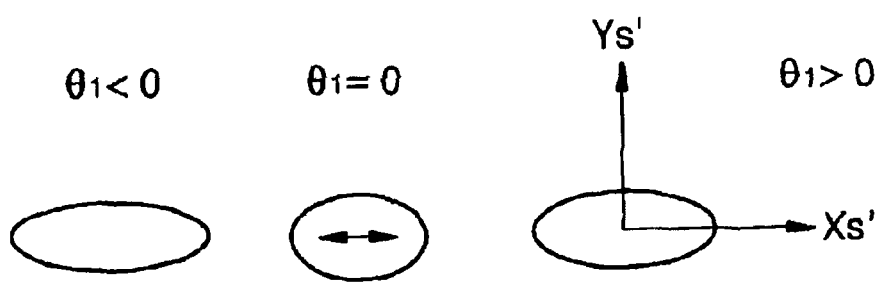
Figure 4C:
Figure 4D:
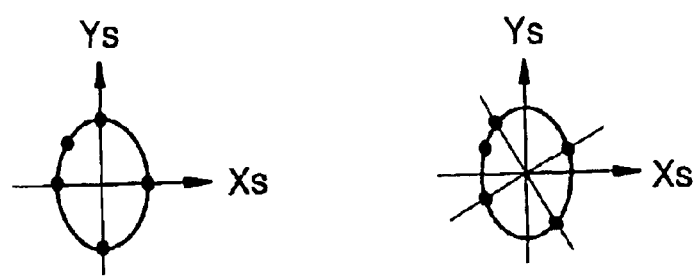
Figure 4E:
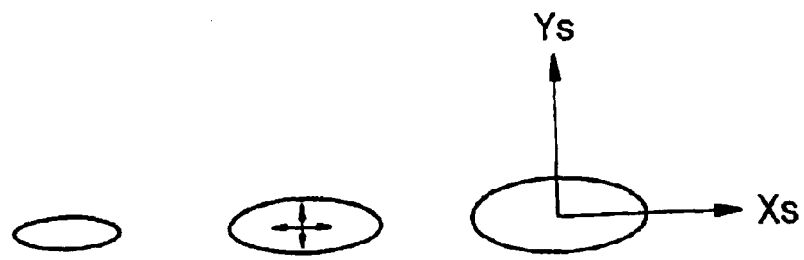

FIG. 4b shows the changes in the axial length of the ellipse with respect to the θ1 wherein three cases of θ1<0, θ1=0 and θ1>0 from the left side. FIG. 4c shows the changes in the axial length and the skewness of the ellipse with respect to the θ2 wherein three cases of θ2<0, θ2=0 and θ2>0 from the left side. FIG. 4d shows the changes in positions of beam spots with respect to the change in θ3. In this case, although the positions of beam spots change, the shape of the ellipse is not. However, the ellipsoidal shape is detected by a position detector 28 with rotated by θ3 which can be measured. FIG. 4e shows the change in the size of the ellipse according to the change of δZa.

Figure 4F:
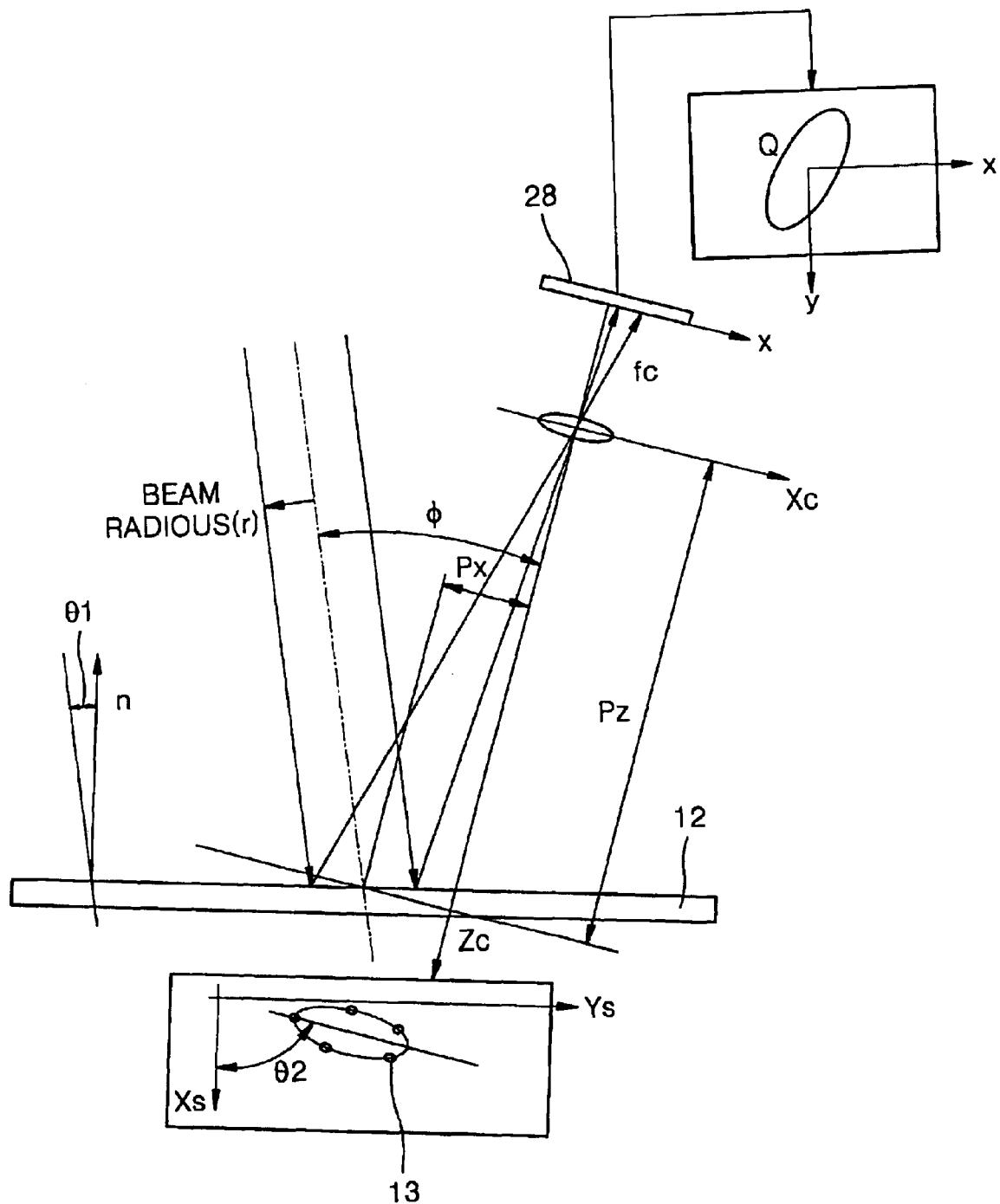

FIG. 4f illustrates the geometrical relationship between a display surface Q of the position detector and the spots. Here, the coordinates (Xc, Yc, Zc) are coordinates of a camera lens. We define fc as the focal length of the position detector, r as a radius of the beam and Φ as an angular displacement between an axis of lens and a axis of beam source. Then, the parameters detected by the 3-dimensional optical detector are the inclination angles θ1 and θ2 of the writing surface relative to the axis of the beam, the rotation angle θ3, a center position (Px, Pz) of the beam on the camera lens coordinate system.

The ellipsodal equation formed by at least five beam spots at a visual surface Q is presented as follows:

$$x^2 + \omega_1 y^2 + \omega_2 xy + \omega_3 x + \omega_4 y + \omega_5 = 0 \quad \text{[Equation 1]}$$

$\omega_1$, $\omega_2$, $\omega_3$, $\omega_4$ and $\omega_5$ are functions of the focal length of lens fc, the radius of the beam r, the angular displacement Φ, the vertical distance Pz between the pen and the writing surface, and the inclination angles θ1 and θ2. Equation 1 has five unknown variables and we need to determine at least five coordinates of the beam spots. For more details, we set up equation 2 as follows:

$$\omega_1 = b/\cos^2(\Theta 1), \; b = 2 \sin \Phi \sin(\Theta 2)\cos(\Theta 1)\sin(\Theta 1)$$

$$\omega_2 = c/\cos^2(\Theta 1),$$

$$c = \cos^2(\Theta 1)\cos 2(\Phi) + \sin 2 \Phi \sin 2(\Theta 1) - 2 \sin \Phi \cos \Phi \cos(\Theta 1)\sin(\Theta 1)$$

$$\omega_3 = -2Px/K, \; K = fc/(Pz + fc)$$

$$\omega_4 = -bPx/(\cos^2(\Theta 1)K)$$

$$\omega_5 = (g - \cos^2(\Theta 1)Px^2)/(\cos^2(\Theta 1)K^2),$$

$$g = r^2(\cos \Phi \cos(\Theta 1) - \sin \Phi \cos(\Theta 2)\sin(\Theta 1))^2. \quad \text{[Equation 2]}$$

We can calculate ω1 through ω5 using the positions of five spots. Here, fc, r and Φ is readily known when we manufacture the electronic pen input device. So, the inclination angles Θ1 and Θ2 can be calculated through ω1 and ω2, and Px and Pz through ω1, ω2, and ω3. On the other hand, the rotating angle Θ3 of the beam can be known from the method shown in FIG. 4d. At this time, it is prefer to transfer the ellipsoidal equation into an equation of a circle. Through equation 2, the geometrical transformational information between the axis of the beam and that of camera, and therefore when the axis of the camera lens can be coincident with the axis of the beam through a translation and a rotation thereby the image on the camera display can be caught. This makes it possible to determine the rotating angle Θ3 of the spot.

References which illustrate the above described mechanism can be found at "The use of taper light for object recognitions" by D. Wei, Robot vision, IFS Ltd., pp. 143~153 and "The development of a visual information processing system of a cylindrical laser beam projection for a recognition of planar object" by Kim Jonghyung, a subscription for Master of Science, KAIST, 1989.

Figure 5:
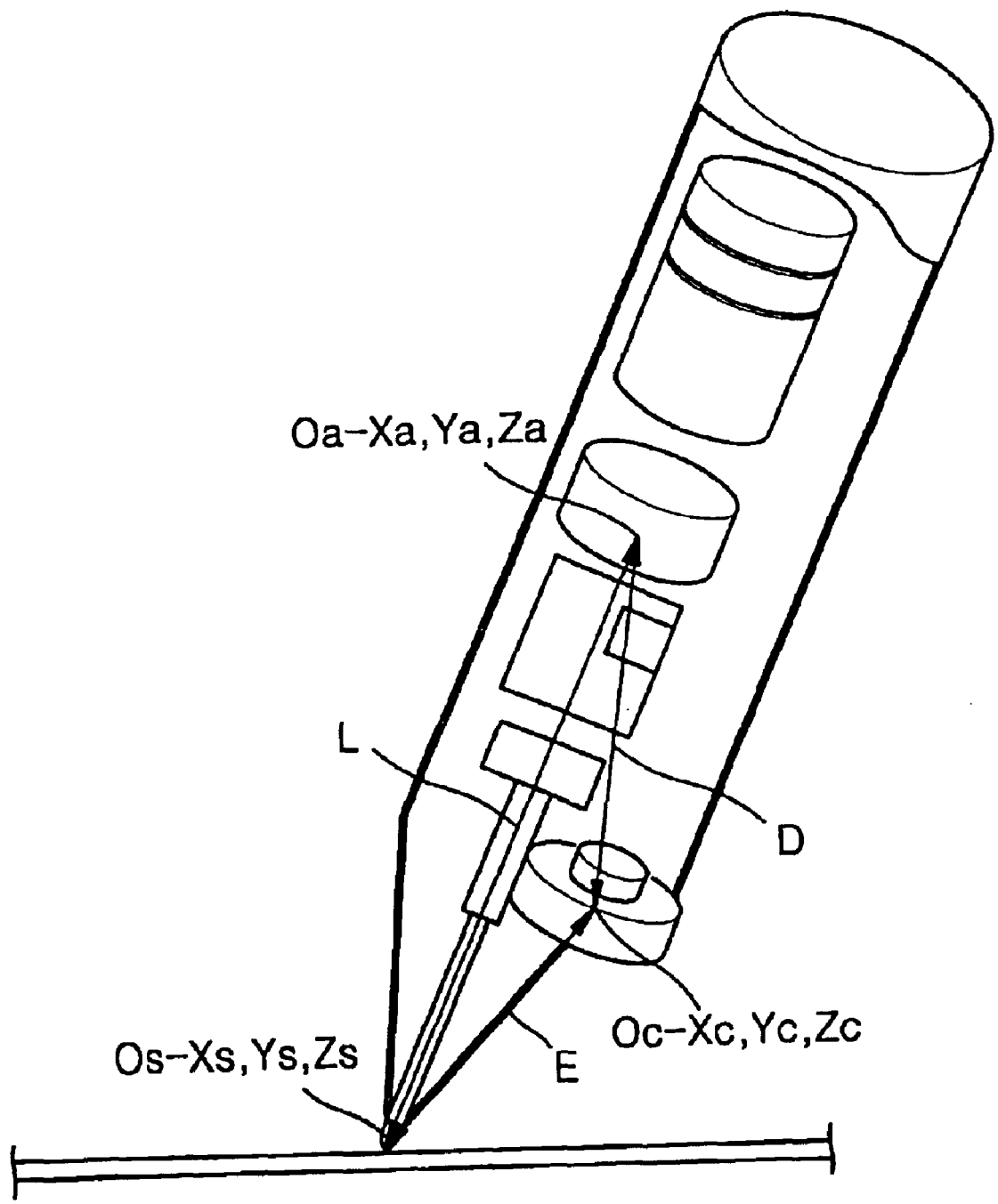
FIG. 5 shows each of the coordinates used in each of 3-axis accelerometer, 3-dimensional optical detecting apparatus and the tip of the pen.

FIG. 5 shows each coordinate system for 3-axis accelerometer 4, 3-dimensional optical detector and tip 12 of the electronic pen input device. We define Os as a coordinate system for the tip, Oa as for 3-axis accelerometer 4 and Oc as for 3-dimensional optical detector 6-A. Due to the structure of the electronic pen input device, the inclination angle and the height of the pen detected in the coordinate system of 3-dimensional optical detector 6-A are different from those acquired in the coordinate system of the tip. Particularly, in case of the 3-dimensional optical detector 6-A shown in FIG. 2, the inclination angles of each coordinate systems are quite different. To compensate this difference, it is prefer to calculate a vector E shown in FIG. 5. As a same manner, the data from Oc and Oa can be geometrically transferable by calculating a vector D, and the data from Oa and Os can be geometrically transferable by calculating a vector L, which depend upon the design of the electronic pen input device.

Figure 6:
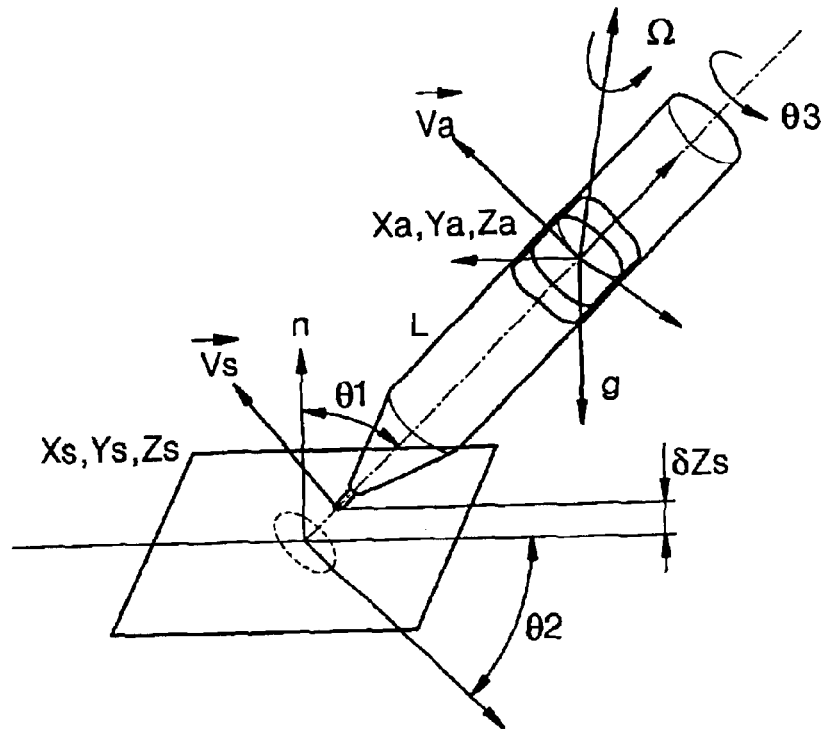
FIG. 6 shows various parameters to determine the position of a pen, including an inclination angle of the pen relative to the ground, a height, velocity and angular velocity of the 3-axis accelerometer in coordinates Oa, and velocity and normal vector of the tip in coordinates Os.

FIG. 6 shows various parameters for describing the motion of the pen including the inclination angle and the height of the pen, the velocity and the angular velocity in the coordinates Oa, and the velocity of the pen tip and a perpendicular vector n to the ground in the coordinates Os.

Figure 7:
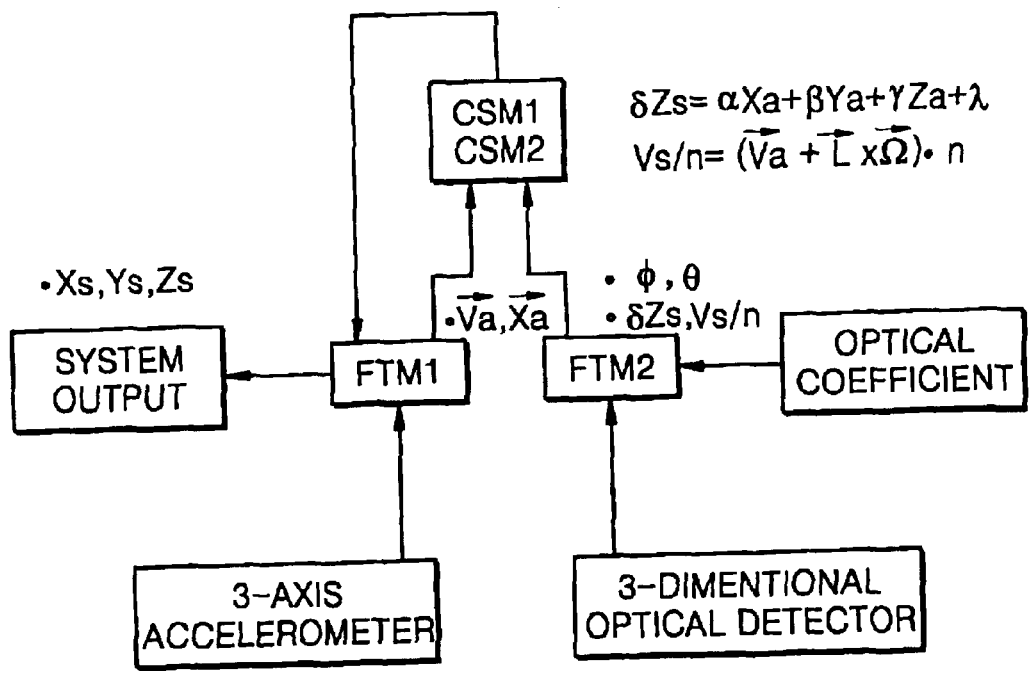
FIG. 7 shows a basic structure of a perception net for a sensor fusion.

FIG. 7 shows the structure of a perception net for a sensor fusion of the electronic pen input device. Firstly, the signal from the 3-axis accelerometer 4 is transformed into a velocity and a position data by a feature transformation module(FTM1). Then, the signal from the 3-dimensional optical detector 6 is transformed into the inclination angle, velocity and the height of the pen by an FTM2. Next, a constraint satisfaction module 1(CSM1) and a CSM2 conduct a signal fusion of signals from the 3-axis accelerometer 4 and the 3-dimensional optical detector 6 with consideration of the constraints in the equation 2. Thereafter, these error-reduced data are fed-back to FTM1 so as to recalculate a more exact velocity and angular velocity data. The equation 2 respectively represent the constraints about the CSM1 (position) and CSM2(velocity). The principle concept of the sensor fusion method are introduced in "Sensor fusion and planning with perception-action network", Lee Suckhan, 1996, International conference on Multisensor Fusion and Integration for Intelligent Systems.

[Equation 3]

$$\delta Z_s = \alpha X_a + \beta Y_a + \chi Z_a + \lambda \quad (1)$$

$$V_{s/n} = (^{pullout;zu597500.900}V_a + ^{pullout;zu597500.900}L \times {}^{pullout;zu597500.900}\Omega) \cdot n \quad (2)$$

Here, the constraint equation (1) represents a constraints about the height of the ground $\delta Z_s$ when the position data detected inside of the pen (Xa, Ya, Za) are transformed into the coordinates (Xs, Ys, Zs) of the pen tip. The positions (Xs, Ys, Zs) represent the positions by integrating the velocity which in turn integrates the acceleration detected inside of the pen. Here, the constants $\alpha$, $\beta$, $\chi$ and $\lambda$ can be calculated with the data of the length of the pen and the inclination angle of the pen relative to the ground. A linear combination of each of signal errors must satisfy the constraints of the height $\delta Z_s$ of the tip 11 so that the accumulated errors in the position signals (Xs, Ys, Zs) of each sensor can be reduced.

On the other hand, CSM2 represents the velocity Va obtained by integrating the acceleration signal inside of the pen, the angular velocity of $\Omega$ and the length to the tip of the pen L. The vertical velocity Vs/n at the tip 11 of the pen can be calculated by a gradient operation of the line velocity Vs and the normal vector n. This makes the velocity components (Vax, Vay, Vaz) obtained inside of the pen satisfy the constraints about the ground, that is, while the electronic pen input device is touching the writing surface, the relationship of Vs/n=0 must be satisfied. Also, while the pen is separating from the writing surface, each component of the velocity must satisfy the constraint equation thereby reducing an accumulated error in the velocity. As described above, the sensor fusion technique with the feedback system can avoid the increase in the accumulated error and maintain the information within a predetermined error range.

Figure 8:
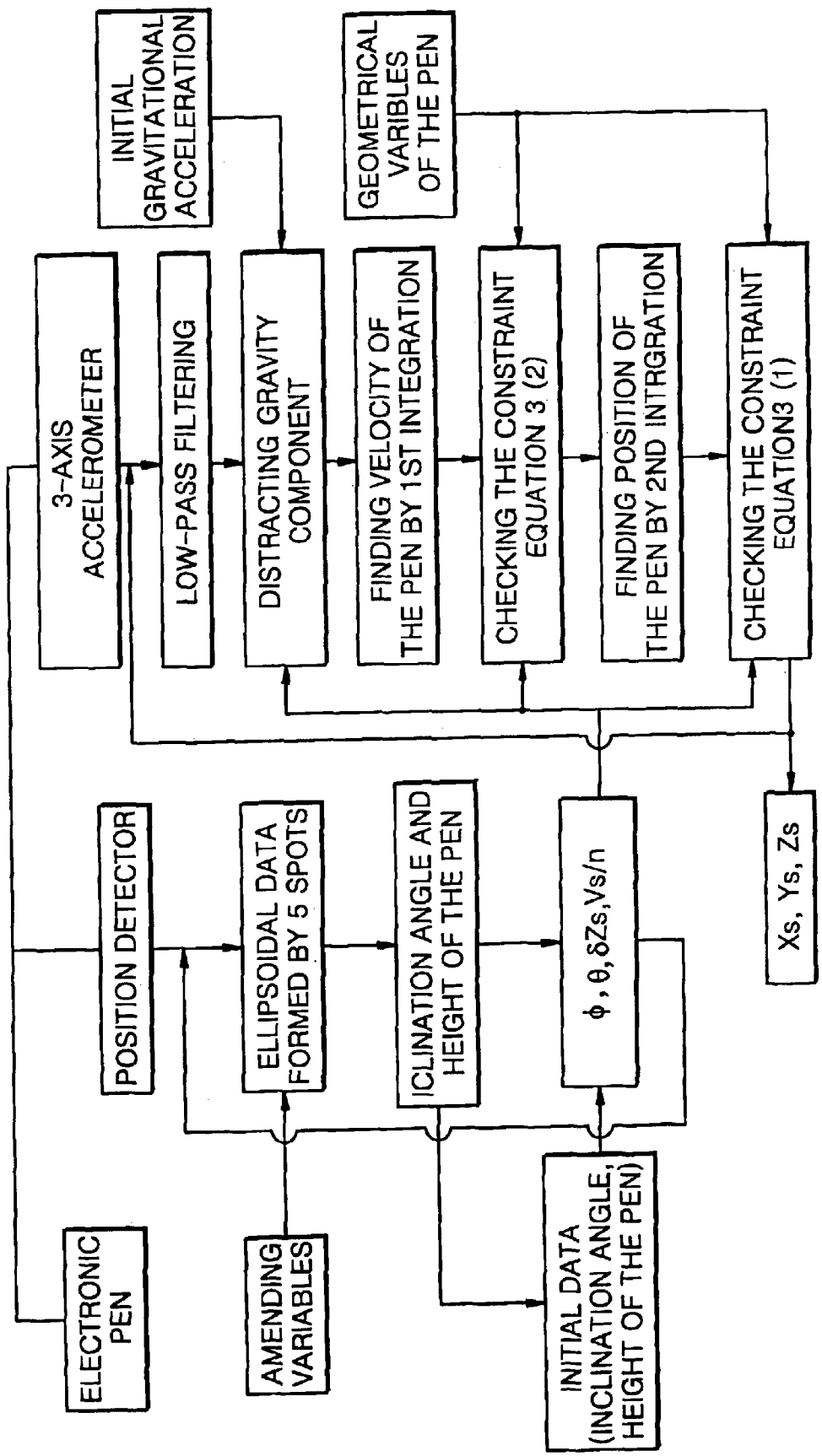
FIG. 8 is a flowchart showing the data processing.

FIG. 8 is a flowchart of a data processing in the 3-axis accelerometer 4 and the 3-dimensional optical detector 6-A. Firstly, the ellipsoidal data which is formed by five spots scattered from the writing surface 12 and detected at the 3-dimensional optical detector 6-A are used to calculate the inclination angle and the height of the pen relative to the writing surface 12 by using the position detector 28. The data calculation procedure is already explained with reference to the FIG. 4. When we get the inclination angle and the height of the pen, the angular velocity and vertical movement velocity can be calculated by differentiation with initial values.

Thereafter, the acceleration signal is read by the 3-axis accelerometer 4 and low-pass filtered to reduce the noise. Basically, the acceleration signal always contains a gravity component which must be distracted from the acceleration signal. The amplitude of each signal due to the gravity portion is difficult to calculate theoretically, so the gravity portion is determined initially when the electronic pen input device is stationary. Accordingly, we can get an acceleration signal purely dedicated to the pen motion. Secondly, by taking integration of the acceleration signal, the velocity of the pen can be obtained. However, there may be generated an accumulated error during the integration due to the noise. To compensate this error, the constraint equation 3(2) is adopted by using a velocity detected at the tip of the pen. Considerations about the angular velocity and the geometry of the pen are required to determine the velocity at the tip 11. Therefore, a modified velocity component is determined and updated continuously as shown in FIG. 7. Thirdly, a displacement of the pen is calculated by taking an integration of the velocity component. The accumulated error during the integration is calculated with equation 3(1) so that a modified displacement component is obtained as shown in FIG. 7. Through the above calculations, the accumulated error generated due to the double integration is compensated by using the equation 2, thereby obtaining the displacement data (Xs, Ys, Zs) of the electronic pen input device of the invention.

FIG. 8 shows the adoption of a CPU 5 to process data including the inclination angle, the angular velocity, the height and the vertical velocity detected by the 3-axis accelerometer 4 and the 3-dimensional optical detector 6-A. As mentioned above, the CPU 5 can be embedded inside of the electronic pen input device and send the calculation result to a separate computer or a PDA in wired or wireless form, or otherwise the detected data only are send to a CPU inside of a separate computer or a PDA.

As described heretofore, the electronic pen input device of the invention can provide an accurate position information thereof by a unique signal processing including a deleting the gravity portion in the acceleration signal and a reducing the accumulated error generated in the integration process while transforming the acceleration signal into a displacement signal.

What is claimed is:

1. An electronic pen input comprising:
   an optical 3-dimensional detecting device that radiates light and detects reflections of the radiated light for detecting orientation angles of a centerline of the pen relative to a ground and a height of the pen over a writing surface;
   a 3-axis accelerometer for detecting a movement of the pen; and
   a communication means for sending the detected information to a post processing device.

2. The electronic pen as claimed in claim 1, wherein the optical 3-dimensional detecting device includes a beam radiating portion for radiating beam onto the writing surface so as to form beam spots, and a detecting portion for detecting the beam spots.

3. The electronic pen input device as claimed in claim 2, wherein the beam radiating portion includes a light source, a first lens for making a beam radiated from the light source go parallel, a lattice dividing the beam through the first lens, and a second lens for directing the beam through the lattice onto the writing surface.

4. The electronic pen input device as claimed in claim 2, wherein the detecting portion includes a camera lens for condensing the beam spots on the waiting surface and a position detector detecting the beam coming through the camera lens.

5. The electronic pen input device as claimed in claim 2, further comprising a signal processor for detecting positions of the beam spots detected by the position detector, and a calculator for determining the height of the pen over the writing surface and the orientation angles thereof relative to the ground using the positions of the beam spats.

6. The electronic pen input device as claimed in claim 2, further comprising a controller for controlling an on/off operation of the light source.

7. The electronic pen input device as claimed in claim 2, wherein the beam radiated from the beam radiating portion is offset in centerline thereof relative to the centerline of the pen.

8. The electronic pen input device as claimed in claim 1, further comprising a storing means for storing a movement information of the pen obtained from the processing device.

9. The electronic pen input device as claimed in claim 1, wherein the communication means includes a radio-frequency(RF) communication device.

10. The electronic pen input device as claimed in claim 1, further comprising a battery for operation.

11. The electronic pen input device as claimed in claim 1, further comprising a data processing means for determining the absolute position of the pen tip using data from the 3-axis accelerometer and the optical 3-dimensional detecting device.

12. The electronic pen input device as claimed in claim 1, further comprising a stress sensor connected with the tip portion of the pen for detecting whether the tip portion contacts the writing surface.

13. The electronic pen input device as claimed in claim 1, further comprising an ink bottle connected with the tip portion so as to inject ink when the pen operates while contacting with a predetermined writing paper.

14. A coordinate detecting method comprising:
(a) detecting three-directional orientation angles of a pen with respect to a writing surface and a height therebetween and detecting a movement of the pen, based on light reflected off the writing surface;
(b) transmitting the orientation angles, the height and the movement information to a signal processor so as to determining a position of a tip portion of the pen; and
(c) sending the position information to a terminal device by using a communication means.

15. The method as claimed in claim 14, wherein step (a) includes the substeps of:
(a1) emitting a beam;
(a2) directing the beam onto the writing surface so as to form at least five spots;
(a3) collecting a reflected beam from the writing surface; and
(a4) determining three-directional orientation angles of the pen relative to the writing surface and height thereof over the writing surface.

16. The method as claimed in claim 15, wherein step (a) includes the substeps of:
(a11) determining the orientation angles and the height over the writing surface by using an ellipsoidal equation formed with at least five spots collected; and
(a12) differentiating the result orientation angles and the height of the pen so as to find an angular velocity and a vertical velocity from initial values thereof.

17. The method as claimed in claim 14, wherein step (b) includes the substeps of:
(b1) subtracting a gravity portion from an acceleration signal;
(b2) integrating the gravity-free acceleration signal so as to determine the velocity of the accelerometer of the pen;
(b3) compensating an accumulated error in velocity of the accelerometer by using the vertical velocity against the ground;
(b4) integrating the velocity so as to determine a position of the accelerometer of the pen;
(b5) compensating an accumulated error in the position of the accelerometer so as to determine the position of the pen thereof; and
(b6) converting the position of the pen into an absolute position of the pen tip using a geometry of the pen and the obtained orientation angles.

18. The method as claimed in claim 17, further comprising the steps of:
lowpass filtering to an acceleration signal from a 3 axis acceleration sensor provided inside the pen.

19. The method as claimed in claim 14, wherein step (c) is performed by a radio frequency (RF) communication method.

20. A coordinate determining method comprising:
(a) measuring orientation angles of a pen relative to a writing surface and a height thereof over the writing surface and measuring acceleration signals of the pen, based on light reflected off the writing surface;
(b) sending the measured signals to a terminal through a communication means; and
(c) transforming the orientation angle, the height and the acceleration signals by a processor in the terminal so as to determine a position of the pen.

21. The method as claimed in claim 20, wherein step (a) includes the substeps of:
(a1) directing an emitted beam onto the writing surface so as to form beam spots thereon;
(a2) collecting a reflected beam from the spots; and
(a3) detecting the collected beam.

22. The method as claimed in claim 20, wherein step (c) includes the substeps of:
(c1) subtracting a gravity portion from the acceleration signals;
(c2) integrating the gravity deleted acceleration signal so as to determine the velocity of the accelerometer of the pen;
(c3) compensating an accumulated error in velocity of the accelerometer by using the vertical velocity information against the ground;
(c4) integrating the velocity so as to determine a position of the accelerometer of the pen;
(c5) compensating an accumulated error in the position of the accelerometer so as to determine the position of the pen thereof; and
(c6) converting the position of the pen into an absolute position of the pen tip using a geometry of the pen and the obtained orientation angles.

23. The method as claimed in claim 22, further comprising the steps of:
lowpass filtering to an acceleration signal from a 3-axis acceleration sensor provided inside the pen.

24. The method as claimed in claim 20, wherein step (c) is performed by a radio frequency (RF) communication method.

* * * * *